No. 870,806. PATENTED NOV. 12, 1907.
W. V. TURNER.
FLUID PRESSURE BRAKE.
APPLICATION FILED APR. 12, 1907.
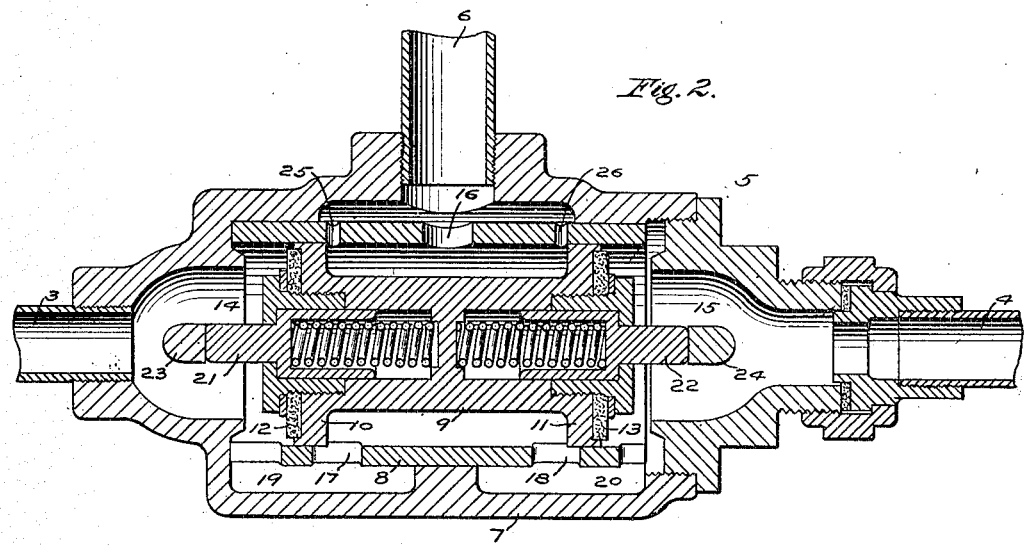
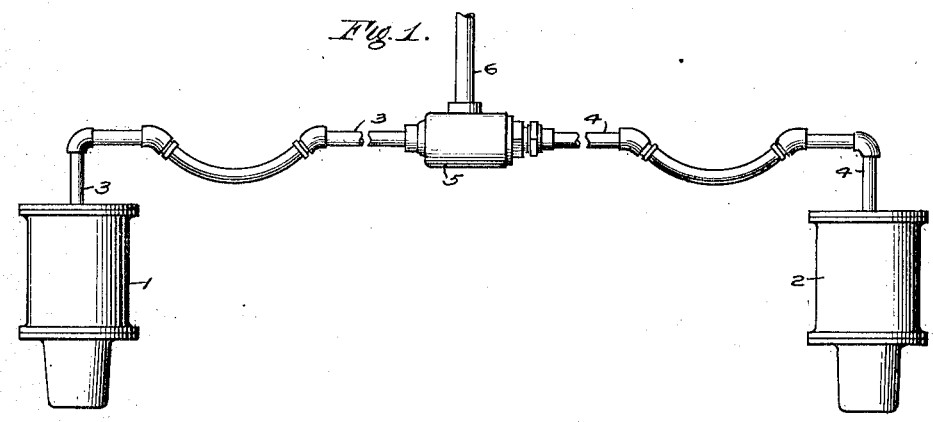
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 870,806.　　　Specification of Letters Patent.　　　Patented Nov. 12, 1907.

Application filed April 12, 1907. Serial No. 367,809.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and particularly to equipments in which two or more brake cylinders are supplied with fluid under pressure from a common supply pipe. In such arrangements, should an excessive leakage of fluid under pressure occur in any one of the brake cylinders, as might be caused by a broken pipe, burst flexible hose, or the like, the air from all of the brake cylinders supplied from the same common supply pipe would likewise leak away and all braking power would be lost.

The main object of this invention, therefore, is to prevent a total loss of braking power when an excessive leakage occurs from one of the brake cylinders or its pipe connections.

Another object of my invention is to provide an improved double check valve device, which may be employed at the connection of a single supply pipe to two outlet pipes and operate upon an excessive reduction in pressure in one of said outlet connections to close communication from the supply pipe to said outlet.

In the accompanying drawings; Figure 1 is a diagrammatic plan view of two brake cylinders connected to a common supply pipe, with my invention applied thereto; and Fig. 2 a central sectional view of one form of improved double check valve device embodying my invention.

According to the construction embodying my improvements, as illustrated in Fig. 1, a single supply port, or pipe, 6, which may lead from a brake valve, triple valve, or other means for controlling the supply of fluid under pressure, is connected through a double check valve device 5 with the two branch pipes 3 and 4 leading to the respective brake cylinders 1 and 2. This construction is especially adapted for use where two or more brake cylinders are mounted on pivoted wheel trucks or other movable parts and are supplied from a common source or controlling means; and in such cases a flexible hose, or pipe section, is inserted in the respective branch pipes, as shown in Fig. 1, to allow for the swinging movement of the trucks. As this flexible pipe section is more liable to be broken, or give rise to excessive leakage, than a fixed pipe connection, I provide a double check valve device at the junction of the branch pipes with the common supply pipe, whereby any excessive leakage from the cylinder or branch pipe upon one side will cause the communication from the supply pipe to said branch pipe to be closed and thereby retain the pressure in the other brake cylinder. Any suitable form of check valve device may be employed for this purpose, but according to the second feature of my invention I have provided a preferred form of double check valve device adapted to be inserted between a common source or supply and two outlet or branch pipes and operate upon an excessive reduction in pressure in one of said outlets to close communication to such outlet. This preferred construction of double check valve device 5, as shown in Fig. 2, comprises a casing 7, within which is a cylindrical bushing 8, containing a double seated piston 9, having piston heads 10 and 11, on which are provided suitable valve faces 12 and 13, adapted to control communication to branch outlets 14 and 15, to which pipes 3 and 4 are respectively connected.

The supply pipe 6 is open to the space between the piston heads 10 and 11 through an opening 16 in the bushing 8, which also has outlet ports 17 and 18 controlled by the piston heads 10 and 11 respectively, and communicating through passages 19 and 20 to the branch pipe outlets 14 and 15. The double seated valve piston 9 is normally maintained in an intermediate position, with the branch pipe outlets open, by oppositely arranged spring stops 21 and 22 adapted to engage fixed abutments 23 and 24 arranged in the casing 7.

Under ordinary conditions, fluid under pressure may be supplied to and released from the brake cylinders connected to the branch pipes 3 and 4 without affecting the piston 9, but should there be an excessive leak in any part of the equipment connected to one of the branch pipes, as caused, for example, by a broken pipe or a bursted hose, then on supplying fluid under pressure through the common supply pipe 6, the pressure gradually rises in one branch pipe and on the corresponding piston head, while on the opposite head the pressure cannot build up by reason of the leak, so that the piston 9 being subject on its opposite sides to an unbalanced pressure moves and closes the check valve on the low pressure side and thereby prevents further loss of pressure through the branch pipe affected. If an excessive leak should occur at a time when the brakes are already applied, it will be readily apparent that a similar falling off or reduction in pressure will occur opposite one piston head, so that the greater pressure on the opposite piston head will move the piston and close the check valve on the reduced pressure side.

Conditions, such as an unequal brake piston travel, may necessitate a larger supply of fluid to one branch pipe than to the other, and in order to obviate the tendency of the double valve piston to move and close one of the branch pipes, by reason of the differential of pressure thus created, the outlet ports 17 and 18, controlled by the piston heads 10 and 11 respectively, are so arranged that as the piston 9 makes a preliminary movement in either direction from the normal position shown in Fig. 2, the outlet port opening leading to the branch pipe having the higher brake cylinder pressure, is gradually restricted, while the outlet port opening to the other branch pipe is gradually enlarged, consequently the flow to the brake cylinder requiring the larger volume of air is considerably greater than to the other, which tends to raise the opposing pressures in the brake cylinders and on the piston heads at a more nearly equal rate.

It is to be noted that when one of the check valves is seated, the port, for supplying air around the piston head to the branch pipe, is closed by the piston head on the high pressure side, and in order to control the supply and release of fluid to the brake cylinders still in service; ports 25 and 26 in the bushing 8, normally open to the inner faces of the respective piston heads 10 and 11, and one of which, on movement of the piston 9 to seat one of the check valves, opens to the outer face of the corresponding piston head, thereby again establishing communication between the supply pipe 6 and the brake cylinders still in service. It will thus be apparent that my invention will operate to automatically cut off the communication to a brake cylinder in case of a bursted hose, a broken branch pipe, or other cause producing an excessive leak of brake cylinder pressure, while such differences of pressure as may be caused by increased brake piston travel will not be effective to move the piston and cut off a brake cylinder communication.

Having now described my invention, what I claim as new and desire to secure by Letters Patent, is:—

1. In a fluid pressure brake, the combination with two brake cylinders, a common source of fluid pressure supply, and a branch pipe connecting said source to each brake cylinder, of means for closing communication through a branch pipe to one brake cylinder on excessive leakage therefrom.

2. In a fluid pressure brake, the combination with two brake cylinders, a common source of fluid pressure supply, and a branch pipe connecting said source to each brake cylinder, of a double check valve device for closing communication to one brake cylinder on excessive leakage therefrom.

3. In a fluid pressure brake, the combination with a plurality of brake cylinders, a common source of fluid pressure supply, and two branch pipes for supplying fluid to said brake cylinders, of a double check valve device for controlling communication through said branch pipes to the brake cylinders.

4. In a fluid pressure brake, the combination with a plurality of brake cylinders, a common source of fluid pressure supply, and two branch pipes for supplying fluid to said brake cylinders, of a double check valve device for closing communication through a branch pipe to one brake cylinder, on excessive leakage therefrom, and means for normally maintaining open communication to both branch pipes.

5. In a fluid pressure brake, the combination with a plurality of brake cylinders, a common source of fluid pressure supply, and two branch pipes for supplying fluid to said brake cylinders, of means for closing communication through a branch pipe to one brake cylinder on excessive flow of fluid thereto, and means tending to resist the closing of said communication under slight variations of fluid pressure.

6. In a fluid pressure brake, the combination with a plurality of brake cylinders, a common source of fluid pressure supply, and two branch pipes for supplying fluid to said brake cylinders, of a double check valve for controlling communication between said source of supply and said branch pipes and adapted on preliminary movement from its normal position to restrict one communication and enlarge the other.

7. In a fluid pressure brake, the combination with two brake cylinders, of a common source of fluid pressure supply and two branch pipes for supplying fluid to said brake cylinders, of means subject to the opposing pressures in said brake cylinders for controlling communication thereto.

8. A double check valve device comprising a casing containing a double head valve piston and having an inlet port intermediate the piston heads, and an outlet port communicating with each check valve and controlled by the respective piston heads.

9. A double check valve device comprising a casing containing a double head valve piston having opposite seats, said casing having a common inlet between the piston heads communicating with an outlet port controlled by each piston head and opening to the respective check valve.

10. A double check valve device comprising a casing containing a double head valve piston having opposite seats, said casing having a common inlet between the piston heads communicating with an outlet port controlled by each piston head and opening to the respective check valve, and means for normally maintaining the check valve in open position.

In testimony whereof I have hereunto set my hand.

WALTER V. TURNER.

Witnesses:
R. F. EMERY,
J. B. MACDONALD.